United States Patent [19]
Park et al.

[11] Patent Number: 6,133,527
[45] Date of Patent: Oct. 17, 2000

[54] APPARATUS FOR SECURING CABLE AND ELECTRIC DEVICE COMPRISING THE SAME

[75] Inventors: Seon-Kyu Park; Sang-Su Nam; Dae-Il Chung, all of Suwon, Rep. of Korea

[73] Assignee: SamSung Electronics Co., Ltd., Suwon, Rep. of Korea

[21] Appl. No.: 09/106,099

[22] Filed: Jun. 29, 1998

[30] Foreign Application Priority Data

| Jun. 27, 1997 | [KR] | Rep. of Korea | 97-16108 U |
| Jul. 16, 1997 | [KR] | Rep. of Korea | 97-18883 U |
| Jul. 16, 1997 | [KR] | Rep. of Korea | 97-18886 U |

[51] Int. Cl.$^7$ ................................................... H02G 3/18
[52] U.S. Cl. .................................. 174/65 R; 174/135
[58] Field of Search .................................. 174/65 R, 135

[56] References Cited

U.S. PATENT DOCUMENTS

| 2,131,165 | 9/1938 | Clements | 174/65 R X |
| 3,163,882 | 1/1965 | Falkenberg | 174/65 R X |
| 3,483,309 | 12/1969 | Kerseg et al. | 174/65 R |
| 4,018,982 | 4/1977 | Svekis | 174/65 R |
| 4,655,422 | 4/1987 | Kelsall | 174/65 R X |
| 4,719,314 | 1/1988 | Roberts | 174/65 R |
| 4,965,478 | 10/1990 | Kobayashi et al. | 174/135 X |
| 4,988,831 | 1/1991 | Wilson et al. | 174/65 R |
| 5,243,136 | 9/1993 | Chen | 174/135 X |

*Primary Examiner*—Dean A. Reichard
*Attorney, Agent, or Firm*—Robert E. Bushnell, Esq.

[57] ABSTRACT

An apparatus for securing a cable to the outer case of an electric device and an electric device comprising the same are disclosed. A groove in which the cable can move in a direction perpendicular to the longitudinal direction of the cable is provided at an outer case. The apparatus for securing the device forms a part of the outer case after the apparatus is assembled, and the electric device can be separated without interference with the outer case after the apparatus is detached. The apparatus for securing the cable can be easily detached by a screw driver.

32 Claims, 8 Drawing Sheets

APPARATUS FOR SECURING CABLE AND ELECTRIC DEVICE COMPRISING THE SAME

This application makes reference to, incorporates the same herein, and claims all benefits accruing under 35 U.S.C. §119 from an application entitled *Apparatus for Securing Cable and Electric Device Comprising the Same* earlier filed in the Korean Industrial Property Office on 27 Jun. 1997, and there duly assigned Serial No. 97-16108 by that Office and two other applications both entitled *Apparatus for Securing Cable and Electric Device Comprising the Same* earlier filed in the Korean Industrial Property Office both on Jul. 16, 1997, and there duly assigned Serial Nos. 97-18883 and 97-18886 by that Office.

BACKGROUND OF THE INVENTION

1. Technical Field

The present invention relates to an apparatus for securing a cable transferring electricity or signals to an electric device. More specifically, the invention relates to an apparatus for securing a cable which can be disassembled without pulling a cable provided at an end of the cable from an outer case of the electric device, such as a monitor, and a monitor comprising the same.

2. Related Art

Typically, an electronic device such as a monitor has outer cases, that is, a front case and a rear case, and a cathode ray tube is installed therein. In addition, circuit boards and a metal bracket, which receives the circuit boards, are installed within a frame. Furthermore, one or more cables for transferring an external signal or electrical signal to or from the circuit board is employed. Thus, the cable must be provided with a connector at one end for securing the cable to an external device, and the cable is secured at the other end to the circuit board within the electrical device or monitor.

The problem with such arrangements resides in the fact that, when an outer case and a cable securing device are used, the entire cable must be pulled away from the electric device or monitor during assembly or disassembly, and this consumes much effort and time. Moreover, considerable inefficiency is experienced when the cable is long. Furthermore, often, it is necessary to provide a hole which is large enough to accommodate the size of the connector, but the relatively large size of a hole increases the chances that contaminants, such as dirt, will find their way into the electrical device. One solution to this problem resides in the provision of a piece for covering the hole, but this increases assembly time as well as effort involved in assembling the device.

Therefore, there is a need to provide a device having an outer case which does not interfere with a cable employed with the device during assembly or disassembly of the device, and there is also the need to provide an apparatus for securing the cable to the outer case. Furthermore, there is a need to develop an outer case for an apparatus for securing a cable and an outer case for the electric device which can reduce the time and the effort needed for assembly of the electric device.

SUMMARY OF THE INVENTION

An object of the present invention is to provide a device having an outer case which does not interfere with a cable when assembling or disassembling the device, an apparatus for securing the cable to the outer case, and an electric device comprising the same.

Another object of the present invention is to provide an outer case for an apparatus for securing the cable and an outer case for the electric device which can reduce the time and effort needed for assembly of the electric device.

A further object of the present invention is to provide an apparatus for securing a cable which can be easily detached.

The above and other objects, advantages and features of the present invention will become more readily appreciated and understood from a consideration of the following detailed description of a preferred embodiment of this invention when taken together with the accompanying drawings.

In order to achieve the above objects, a groove through which a cable for supplying signals/electricity can pass longitudinally is formed in the outer case of an electrical device so that the cable is inserted into the groove in a direction substantially perpendicular to the longitudinal direction of the cable when assembling the electric device, and so that the cable is removed in a direction substantially perpendicular to the longitudinal direction of the cable when disassembling the electric device, thereby enabling the outer case to move without interfering with the cable.

The present invention is based on the idea that the problems stated above can be readily solved when the cable moves in a direction substantially perpendicular to the longitudinal direction of the outer case, that is, the cable is inserted laterally, instead of in a longitudinal direction. Therefore, if the cable is assembled or disassembled by moving the cable in a lateral direction, only a groove whose width is the same as or slightly bigger than the thickness of the cable is needed and the size of the connector provided at one end of the cable is relevant.

The present invention also provides an apparatus for securing the cable to be used with the case of the electric device. The apparatus for securing a cable to an electric device having an outer case according to the present invention comprises: a body forming a part of the outer case while preventing the cable from being detached from the electric device when the apparatus engages the electric device, but allowing the cable to separate from the electric device without interference with the outer case when the apparatus is detached from the electric device; and means for securing the body to the electric device separably.

The apparatus of the present invention covers the groove formed on the outer case partly or completely to prevent contaminants, such as dirt, from entering the device from the outside.

An apparatus for securing the cable according to the present invention, wherein the cable can be disassembled from the electronic device without interference with the outer cable when detached from the electric device, can be achieved by the above-stated structure.

Preferably, the means for securing the body snap-fits the apparatus to the electric device and the outer case is formed so as to limit the movement of the apparatus. For example, the body consists of a lower plate and an upper plate, and one of the plates snap-fits the apparatus, while the other plate limits movement of the apparatus with respect to the outer case. The upper plate and the lower plate can be connected with a bending line therebetween, or can be integrated to prevent relative movement of the plates.

Preferably, the apparatus for securing the cable is a molded plastic product, and the apparatus can comprise a resilient protrusion to fix the apparatus to the electric device. The resilient protrusion can be inserted and fixed into a corresponding hole formed on the electric device. It must be understood that it is also possible to provide a resilient protrusion on the electric device and a hole in the apparatus which is contrary to the former case for securing the cable.

Preferably, a hole or a groove to which the cable can be secured is provided on the upper plate to allow sliding insertion or securing of the cable by adhesive. The groove can be designed to open upward to allow entry or withdrawal of the cable through the opening.

The electric device can comprise a part for moving the apparatus to an assembly position when assembling. The part can be designed so that the apparatus for securing the cable can be secured to the cable before disposing the part at a predetermined location, after which the outer case can be moved for assembly. For example, the part can be a metal bracket receiving the electric device therein. After assembling the outer case and the bracket, the apparatus can be fixed to the cable, whereby the apparatus is disposed at an appropriate location.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

The present invention will now be described in detail referring to the accompanying drawings. However, the embodiments hereinafter described should be interpreted as illustrative and in no sense limiting.

Figure 1:
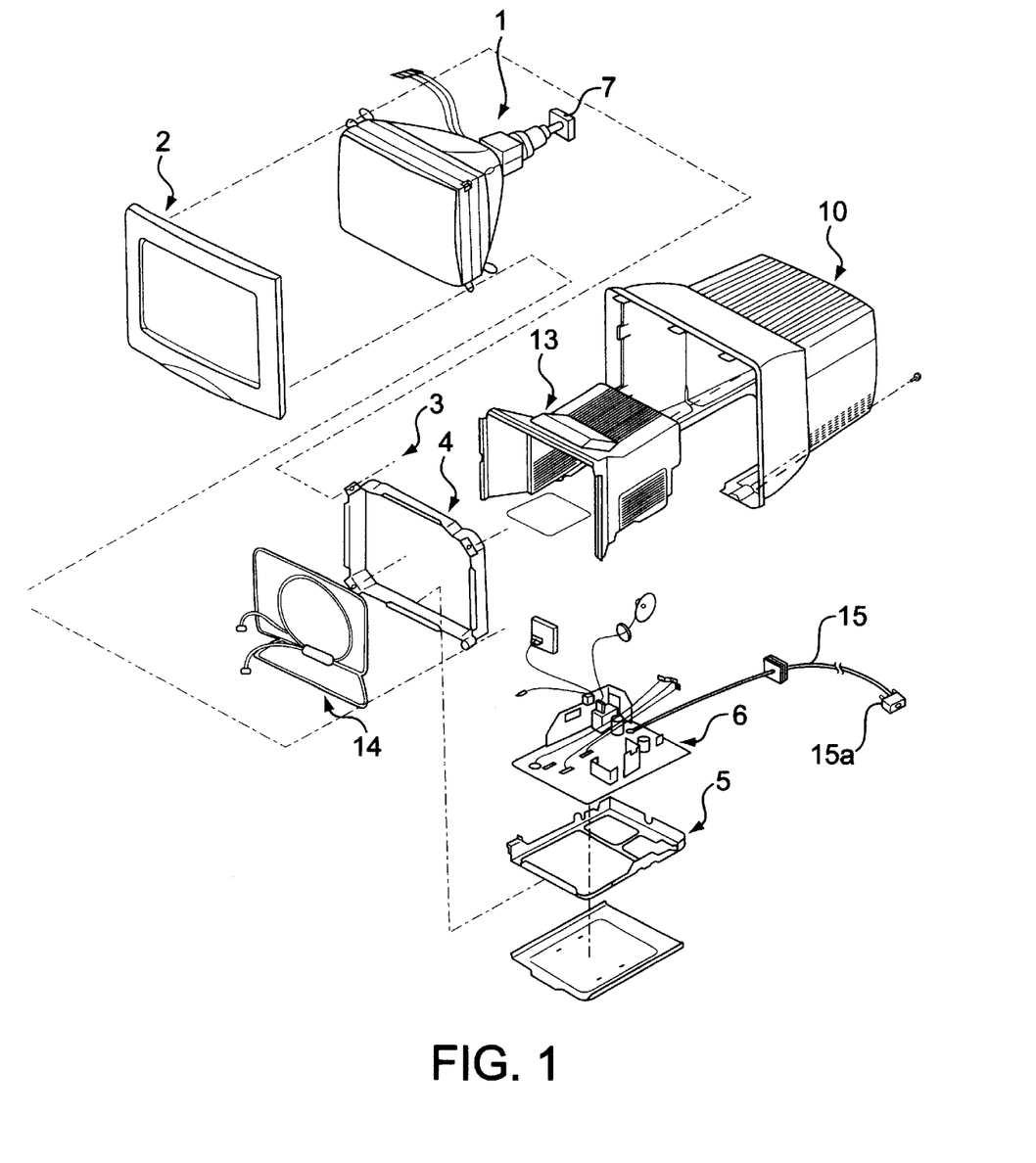
FIG. 1 is an exploded perspective view of a monitor.

Referring to FIG. 1, which is an exploded view of a monitor, an electric device such as a monitor comprises outer cases, such as a front case 2 and a rear case 10, a cathode ray tube 1 installed therein, circuit boards 6 and 7, a metal bracket 5 receiving the circuit boards 6 and 7, a frame 4 for maintaining the outer form of the monitor, a cable 15 for transferring an external signal or electricity, a connector 15a provided at an end of the cable 15, a tilt coil 14 and a securing screw 3, and a shield 13 for preventing electromagnetic waves from leaking. Generally, the cable 15 is provided in the electric device to receive external signals or to feed electricity.

Figure 2:
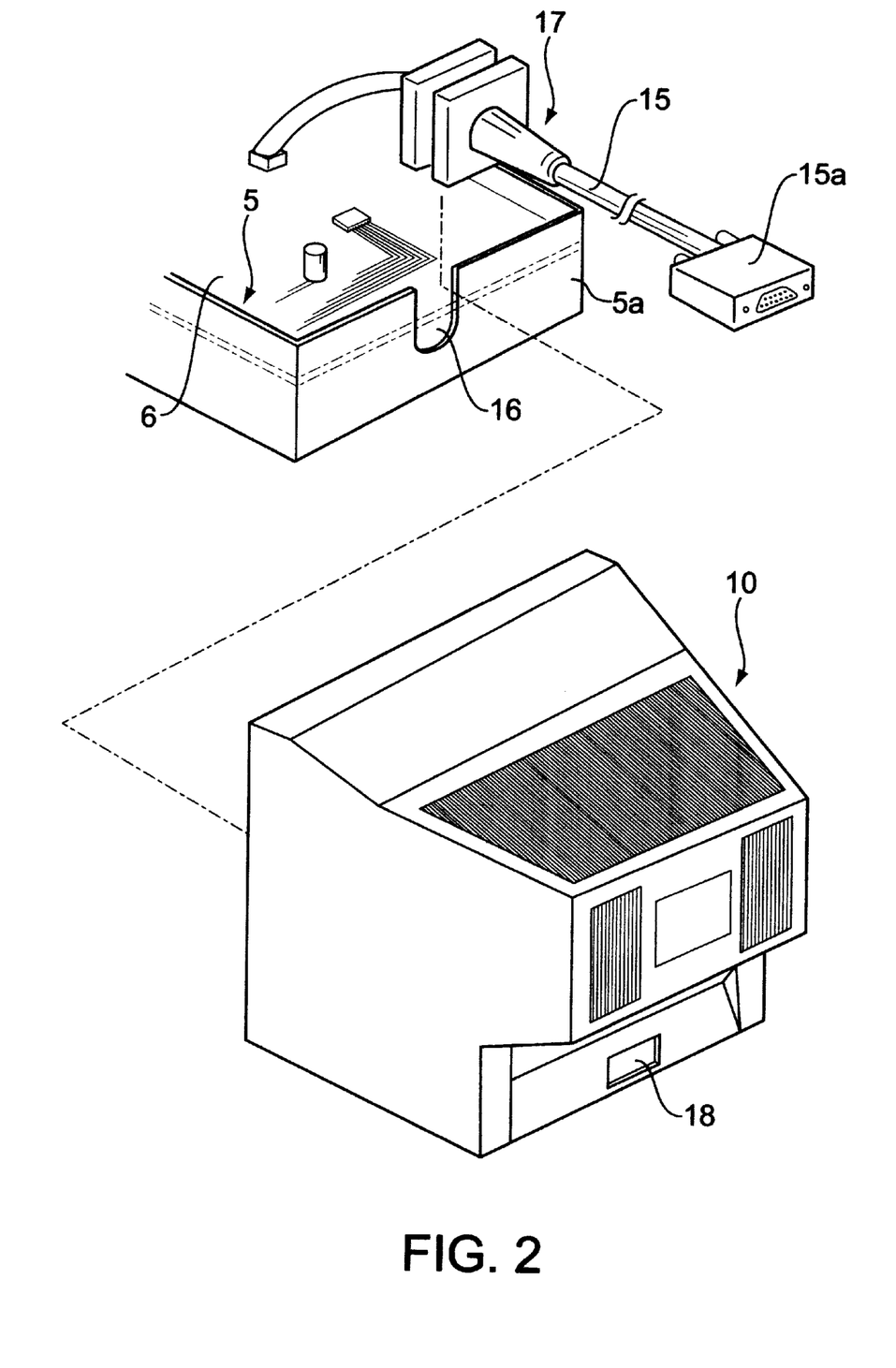
FIG. 2 is a perspective view showing the securing of the cable in the monitor of FIG. 1.

FIG. 2 shows the cable 15 secured to the monitor. As can be seen in FIG. 2, the cable 15 with a connector at one end is secured to the circuit board 15a at another end. In the monitor shown in the drawing, the cable 15 is secured to a cable securing device 17, and the cable securing device 17 is secured within a hole 16 opening upward provided at the rear wall 5a of the bracket 5. At a lower portion of the rear case 10 of the monitor, a groove 18 is formed, and it is through groove 18 that the cable 15 and the connector 15a attached to it can pass. When assembling the monitor, the cable 15 and the connector 15a are secured onto the circuit board 6, followed by insertion of the connector 15a and the cable 15 through the hole 18, and securing of a screw (not shown) by moving the rear case 10 toward the front case 2. When disassembling the rear case 10, engaging means such as a screw (not shown) is released, followed by separation of the rear case 10 from the front case 2. The rear case 10 must be removed after pulling the cable 15 and the connector 15a completely out of the hole 18. Therefore, when using an outer case and a cable securing device 17 of such a type, the whole cable 15 must be pulled away, consuming more effort and time when assembling or disassembling the electric device. In particular, when assembling or disassembling the device, considerable inefficiency is experienced when the cable 15 is long. Also, since a hole whose size is bigger than the size of the connector (which is, in some cases, large) must be provided in the outer case, contaminants such as dirt can enter the device through this hole. Since the internal structure of the electric device can be visible through this hole, a piece for covering the hole has been necessary, but this increases the assembly time and effort involved in assembling the piece.

Figure 3:
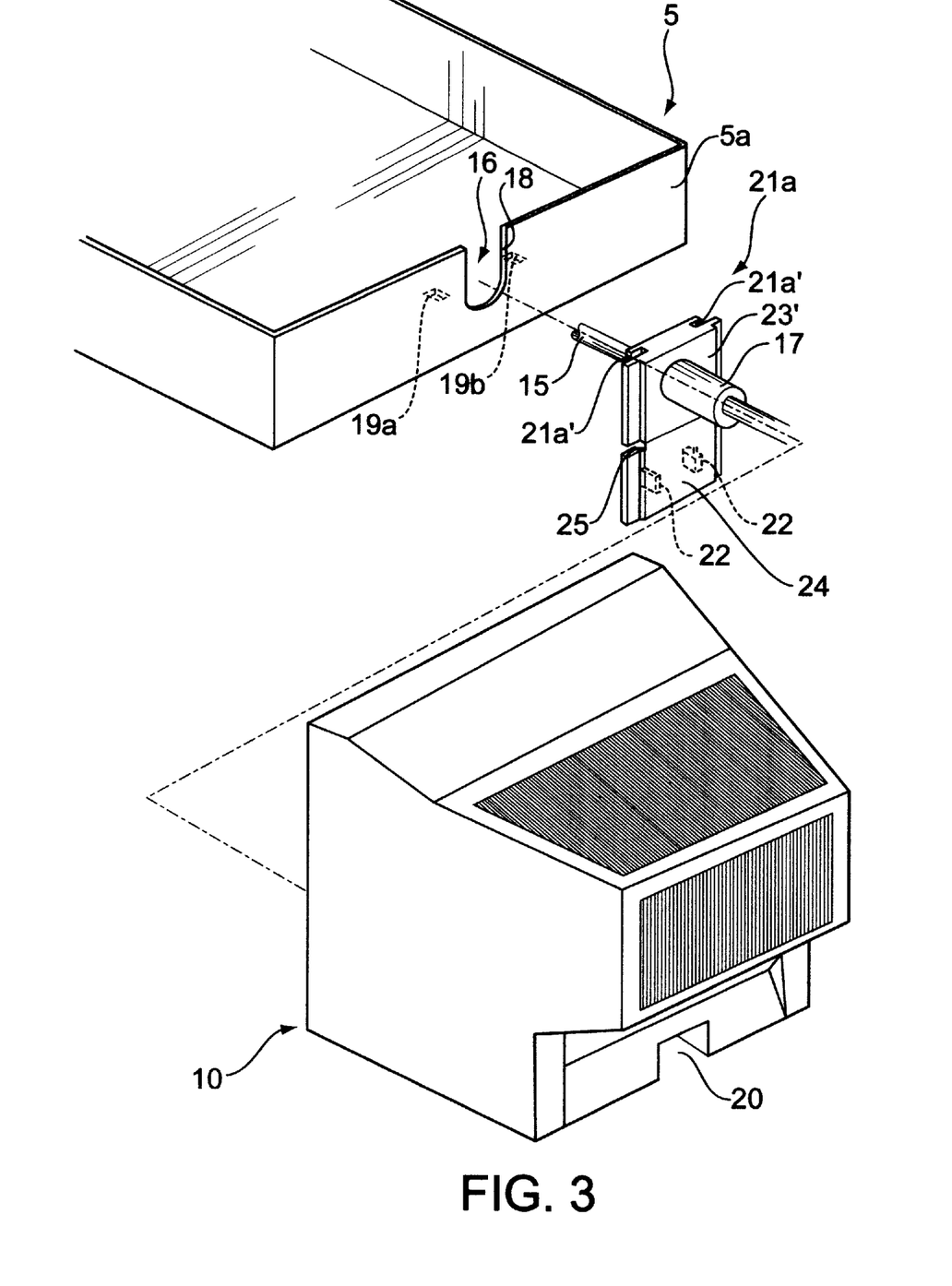
FIG. 3 shows the securing of the cable in a first embodiment of the apparatus for securing the cable according to the present invention.

In FIG. 3, an embodiment of the apparatus 21a for securing the cable 15 and a rear case 10 according to the present invention are shown. In this embodiment, the apparatus 21a for securing the cable 15 comprises an upper plate 23 and a lower plate 24. A boss 17 for receiving the cable 15 is formed in the upper plate 23. Resilient protrusions 22 are provided in the lower plate 24. The apparatus 21a for securing the cable 15 is inserted into a groove 16 provided at the rear side 5a of the bracket 5 which receives a circuit board therein. Grooves 21a' are provided in the upper plate 23 and the rear plate 5a of the bracket 5 slides into grooves 21a', limiting the horizontal movement of the apparatus 21a. The lower plate 24 can rotate vertically with respect to the upper plate 23, and resilient protrusions 22 are provided in the lower plate 24. The resilient protrusion 22 are inserted into the holes 19a and 19b provided in a bottom surface of the bracket 5 when the lower plate 24 is rotated, firmly fixing the apparatus 21a to the bracket 5. A cable groove 20 is formed at the rear bottom side of the outer case 10, and the cable 15 is assembled in a vertical direction perpendicular to the longitudinal direction of the cable. Since the cable is not inserted in the longitudinal direction in the outer case 10 of this structure, a cable groove 20 whose size is smaller than the connector provided at one end of the cable 15 will be sufficient.

In the monitor of the drawing, in order to disassemble the cable 15, the outer case 10 is lifted and separated, followed by pushing inward the resilient protrusion 22 of the lower plate 24 of the apparatus 21a for securing the cable 15, and then vertically rotating the lower plate 24. Finally, the upper plate 23 is lifted to separate the cable 15 from the bracket 5. Therefore, when the apparatus of the present invention is used, the cable 15 can be simply disassembled, and the outer case 10 can be easily separated with the cable attached.

Figure 4:
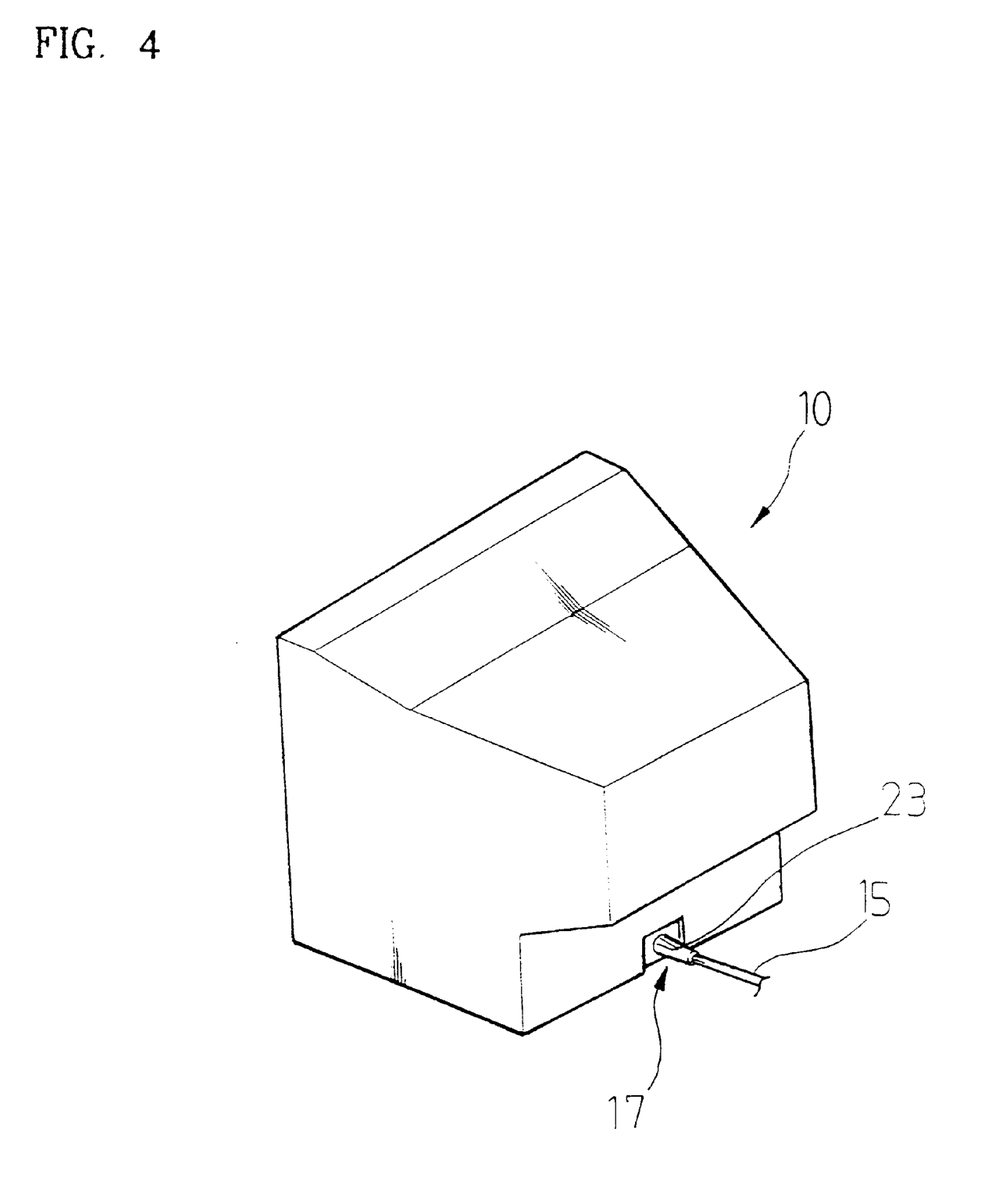
FIG. 4 shows the apparatus assembled to the outer case.

FIG. 4 shows the apparatus 21a for securing the cable 15 assembled to the rear case 10. As can be seen in the drawings, the outer appearance of the electric device is enhanced since the internal structure of the monitor is not visible. Also, since intrusion of contaminants (such as) dirt is prevented, performance of the device is maintained and the period of operation of the device is prolonged.

Figure 5:
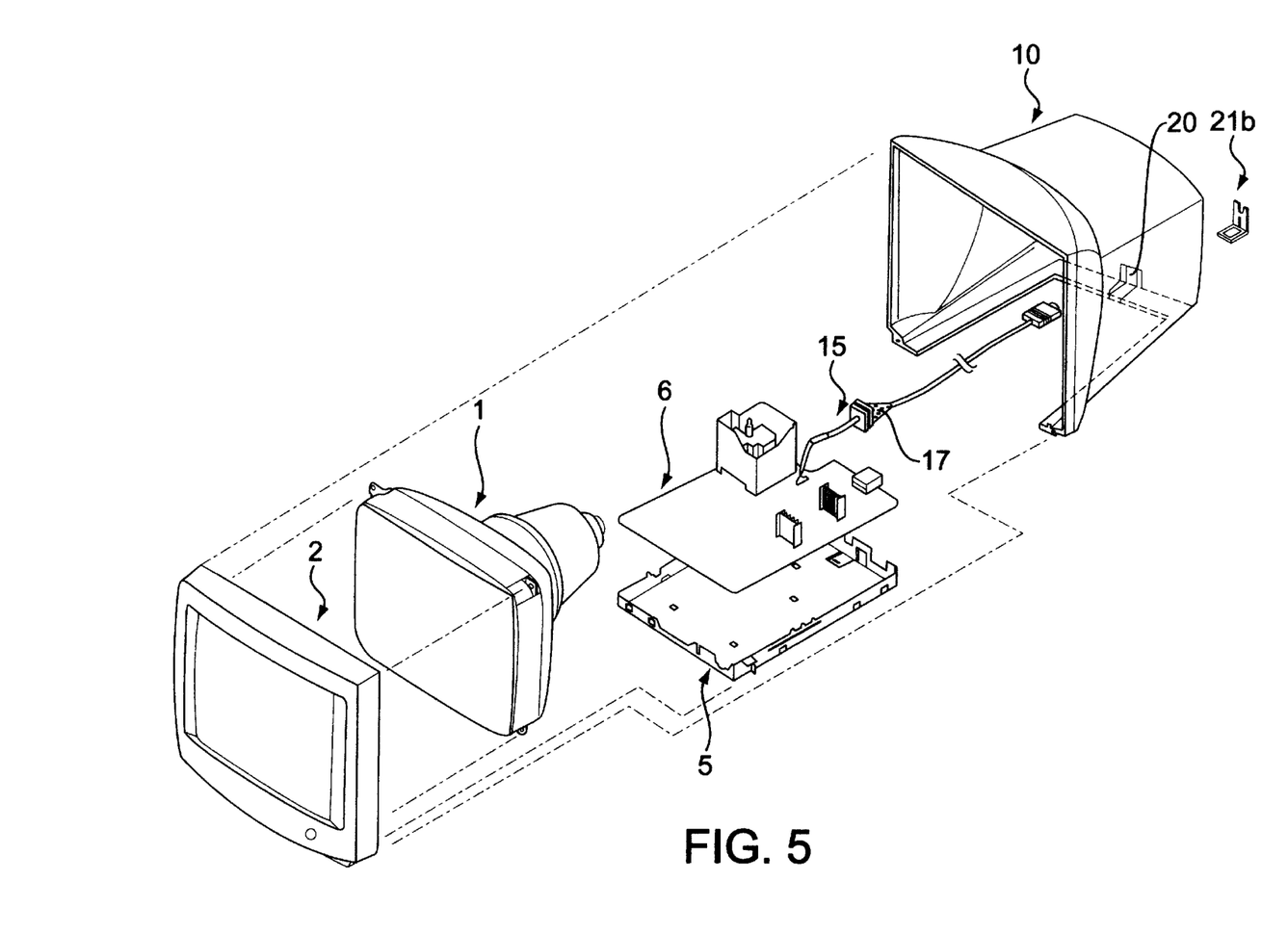
FIG. 5 shows the securing of the cable in a second embodiment of the apparatus for securing the cable according to the present invention.
Figure 6:
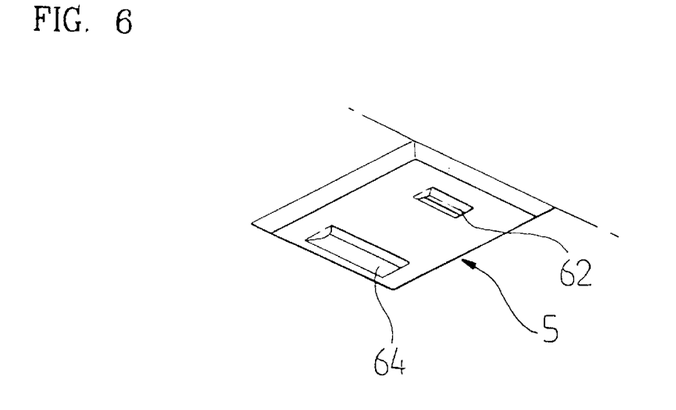
FIG. 6 is an enlarged bottom perspective view of a bracket to which the apparatus is secured.
Figure 8:
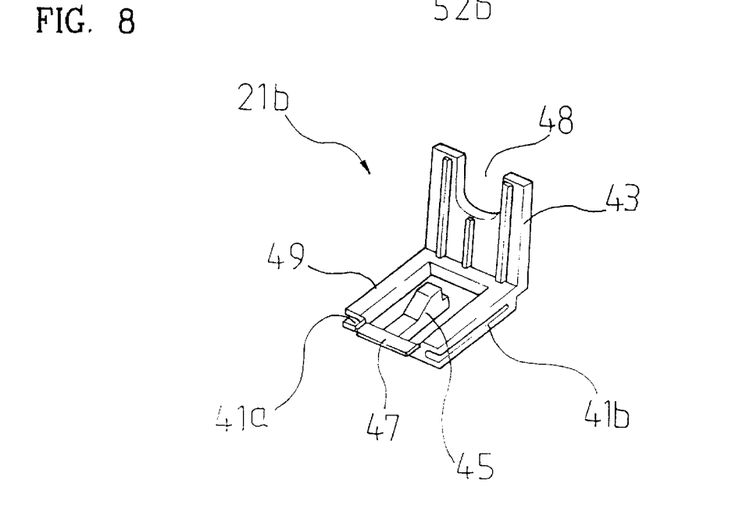
FIG. 8 is an enlarged view of the apparatus of FIG. 5.

FIG. 5 shows a second embodiment of the apparatus for securing a cable according to the present invention, and FIG. 8 is an enlarged view thereof. The second embodiment has an upper plate 43 and a lower plate 49. An upper plate 43 cannot rotate with respect to the lower plate 49, and an insertion groove 48 instead of a boss is formed to receive the cable holder 17. In the second embodiment, protrusions 62 and 64 protruding downward from the bottom surface of the bracket 5 are provided, as can be seen in FIG. 6. The protrusion 64 is biased backward relative to the monitor, and the protrusion 62 is biased slightly forward. Each protrusion secures the apparatus 21b, as hereinafter described.

Figure 7:
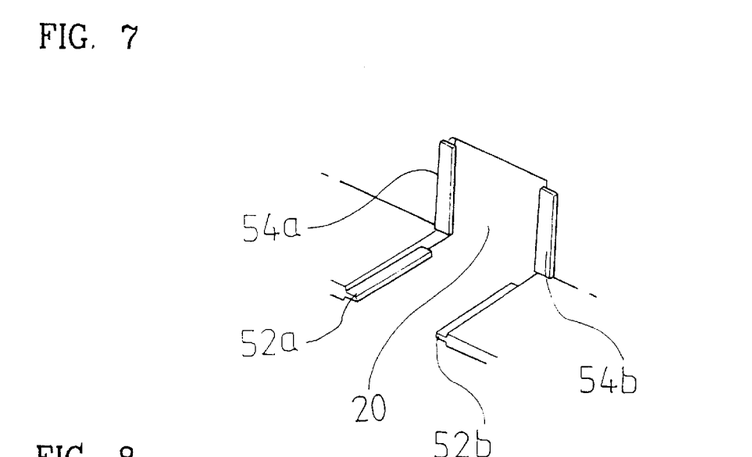
FIG. 7 is an enlarged view of a groove formed on the outer case of FIG. 5.

In this embodiment, a cable groove 20 is provided at a rear bottom side of the rear case 10 of the monitor, as can be seen from FIG. 7. The cable groove 20 is formed by cutting out an edge of the monitor. The cable groove 20 comprises a vertical portion and a horizontal portion connected to the vertical portion. Vertical walls 54a, 54b and horizontal plates 52a, 52b protrude inward from both sides of the groove 20 and are provided at both sides of the cable groove 20. The vertical walls 54a and 54b limit the upper plate 43 of the apparatus from moving backward with respect to the rear case 10, and the horizontal plates 52a and 52b engage a pair of grooves 41a and 41b formed on the lower plate 49 of the apparatus 21b to secure the apparatus 21b to the rear case 10 when assembling.

In FIG. 8, the apparatus for securing the cable according to the second embodiment is shown in detail. A vertical groove 48, to which a cable holder 17 can be inserted, is provided at the upper plate 43 of the apparatus 12b. At the lower plate 49, a resilient protrusion 45 protruding upward is provided. At the front sides of the lower plate 49, a thin horizontal plate 47 is formed. At the side of the lower plate 49, side grooves 41a and 41b are formed.

Figure 9:
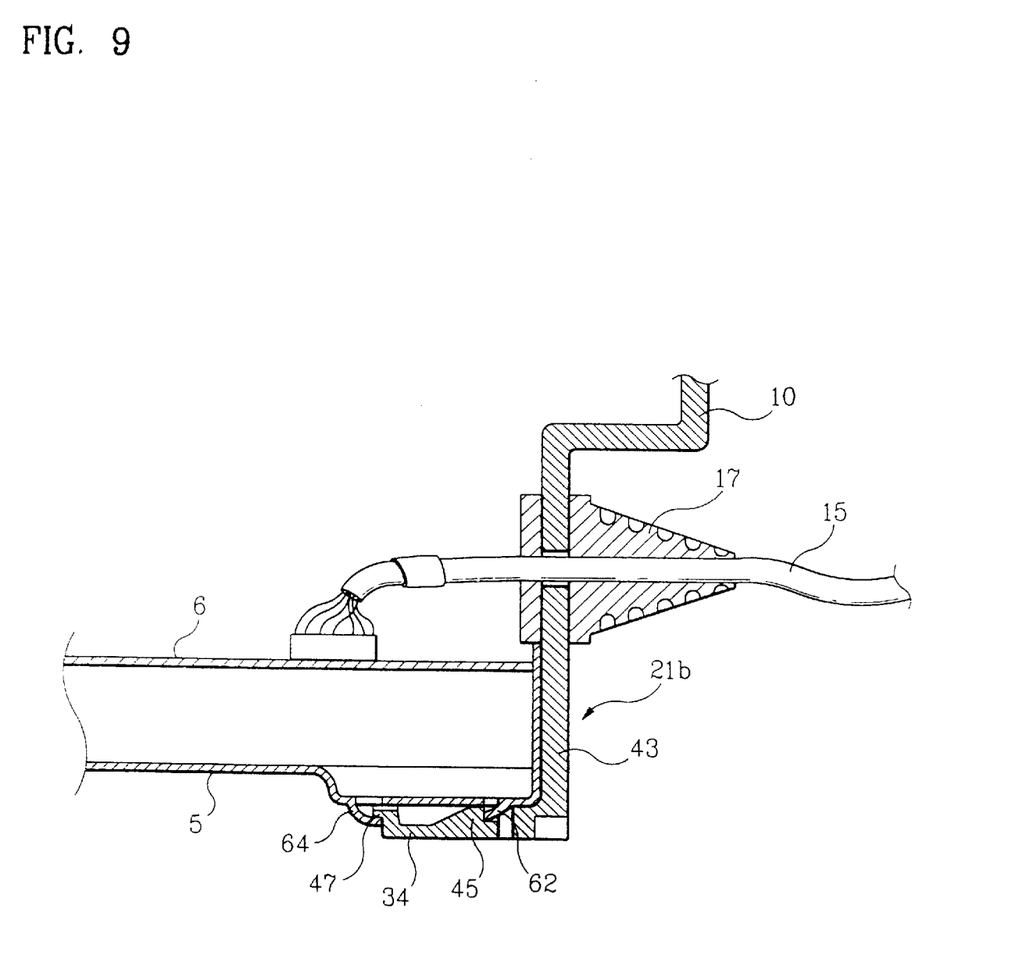
FIG. 9 is a sectional view of the apparatus in an assembled state.

FIG. 9 shows the apparatus assembled. The cable 15 is secured to the cable holder 17, and the holder 17 is inserted into the vertical groove 48 (FIG. 8) formed in the upper plate 43 of the apparatus 21b. The protrusion 64 abuts the horizontal plate 47 and prevents the apparatus 21b from moving forward, while the protrusion 62 abuts with the resilient protrusion 45 and prevents the apparatus 21b from moving backward.

Figure 10:
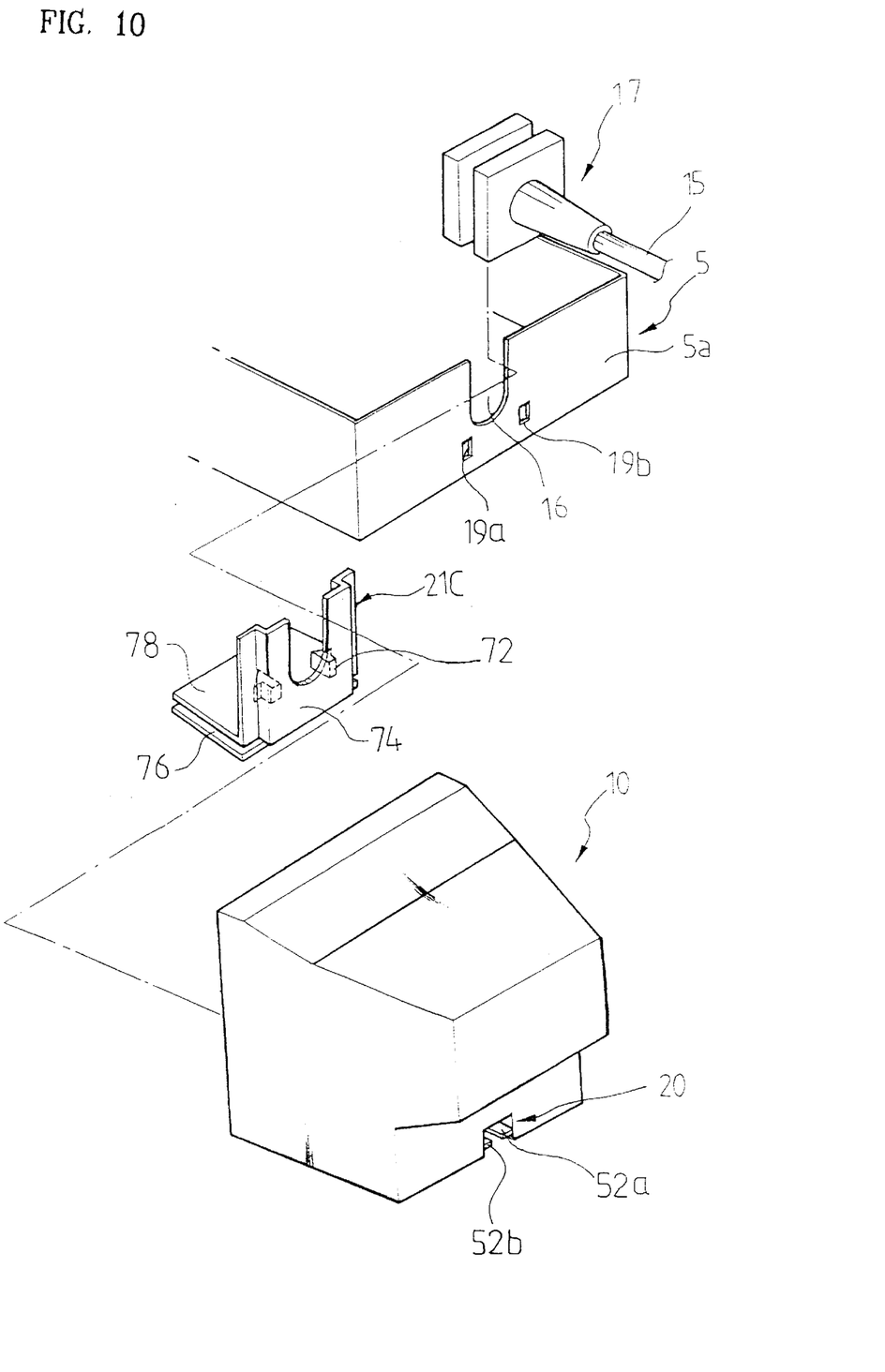
FIG. 10 is a perspective view of a third embodiment of the movement restriction device according to the present invention and an outer case therefor.

FIG. 10 shows a third embodiment of the apparatus for securing the cable according to the present invention. The apparatus 21c consists of an upper plate 74 and a lower plate 76. The upper plate 74 is similar to that of the second embodiment except that resilient protrusions are provided. Side grooves 76 are provided at the lateral sides of the lower plate 78. The side grooves 76 engage the vertical walls 52a and 52b protruding inward at both sides of the cable groove 20. Holes 19a and 19b, into which the resilient protrusion 72 can be inserted, are formed at the back of the rear wall 5a of the monitor. In this embodiment, the cable holder 17 is inserted and fixed into the groove 16 of the bracket 5, and the apparatus 21c can be installed at the rear side of the monitor. Since the procedure for assembling is the same as with the second embodiment, a detailed description therefor is omitted.

Many variations can be possible within the scope of the invention. For example, the resilient protrusions can be provided at the bracket instead of the apparatus, with a hole in the apparatus for securing the cable. Also, the cable groove formed on the rear case can be provided at the rear lateral sides instead of the rear bottom.

What is claimed is:

1. An apparatus for securing a cable to an electric device having an outer case, said apparatus comprising:

a body forming a part of the outer case, said body preventing the cable from being separated from the electric device when the apparatus engages the electric device, and said body allowing the cable to separate from the electric device without interference with the outer case when the apparatus is detached from the electric device; and means for detachably securing the body to the electric device;

wherein the body comprises a lower plate and an upper plate, and wherein the upper plate and the lower plate are interconnected with a bending line therebetween, and said upper plate fits into a groove provided in a metal bracket within the electric device, and wherein said lower plate has a resilient protrusion formed therein to snap fit the body to the electric device.

2. The apparatus of claim 1, wherein the means for detachably securing the body snap fits the body to the electric device.

3. The apparatus of claim 1, wherein the upper plate has a hole formed therein for receiving and fixing the cable therein.

4. The apparatus of claim 1, wherein said lower plate has a resilient protrusion fonned therein to snap fit the body to the electric device.

5. The apparatus of claim 1, wherein the electric device comprises a computer monitor.

6. An apparatus for securing a cable to an electric device having an outer case, said apparatus comprising:

a body forming a part of the outer case, said body preventing the cable from being separated from the electric device when the apparatus engages the electric device, and said body allowing the cable to separate from the electric device without interference with the outer case when the apparatus is detached from the electric device; and means for detachably securing the body to the electric device;

wherein said means for detachably securing the body comprises a resilient protrusion protruding from the apparatus; and wherein the resilient protrusion is inserted and fixed into a hole provided in the electric device, and wherein the body engages a groove provided in the outer case of the electric device, and wherein protruding walls are provided on both sides of the groove, thereby limiting movement of the apparatus.

7. The apparatus of claim 6, wherein the apparatus comprises an upper plate and a lower plate fixed vertically to the upper plate, and wherein the resilient protrusion is provided in the lower plate.

8. The apparatus of claim 7, wherein the upper plate has an upwardly opening groove formed therein, and wherein the cable is fixed to the groove.

9. The apparatus of claim 6, further comprising a part for pushing the apparatus toward the groove when assembling, and for preventing the cable from moving toward the inside of the electric device.

10. The apparatus of, claim 9 further comprising an upper plate having an upwardly opening groove formed therein, and wherein the cable is fixed to the groove.

11. The apparatus of claim 9, wherein the part comprises a metal bracket for receiving a circuit board.

12. The apparatus of claim 11, wherein a portion for pushing the apparatus is provided at a bottom portion of the metal bracket.

13. The apparatus of claim 12, wherein the apparatus closes a portion of the outer case of the electric device when the apparatus engages the outer case after assembly.

14. The apparatus of, claim 13 further comprising an upper plate having an upwardly opening groove formed therein, and wherein the cable is fixed to the groove.

15. The apparatus of, claim 12 further comprising an upper plate having an upwardly opening groove formed therein, and wherein the cable is fixed to the groove.

16. The apparatus of, claim 11 further comprising an upper plate having an upwardly opening groove formed therein, and wherein the cable is fixed to the groove.

17. An electric device having a cable for supplying electrical signals, said device including an outer case having formed therein a groove through which the cable can pass longitudinally, and wherein the cable is inserted into the groove of the outer case in a direction substantially perpendicular to a longitudinal direction of the cable when assembling the electric device, and wherein the cable is removed in a direction substantially perpendicular to the longitudinal direction of the cable when disassembling the electric device, whereby the outer case is moved without interfering with the cable;

said electric device further comprising a bracket having a groove formed therein, and securing means for securing the cable;

said securing means comprising an upper plate and a lower plate, wherein said upper plate fits into the groove of said bracket to secure the cable.

18. The electric device of claim 17, wherein said securing means covers the groove of the outer case in an assembled state.

19. A monitor for displaying an image according to external electric signals comprising:

a front case;

a cathode ray tube secured behind the front case;

a circuit board for mounting electronic devices to apply signals to the cathode ray tube;

a bracket for receiving the circuit board;

a rear case secured behind the front case and containing the cathode ray tube, the circuit board and the bracket therein;

a cable for transferring external signals to the circuit board; and an apparatus for securing the cable, said apparatus forming a part of the rear case when engaging the rear case, and separating the cable from the monitor without interference with the rear case when detached from the monitor.

20. The monitor of claim 19, wherein an upwardly opening groove is provided in a rear wall of the bracket, and wherein a hole is formed in a bottom surface thereof, and wherein the apparatus comprises an upper plate and a lower plate, said upper plate being foldable with respect to the lower plate, said upper plate being inserted and fixed to the upwardly opening groove provided in the bracket, the lower plate comprising a resilient protrusion which is inserted in the hole.

21. The monitor of claim 19, wherein a cut-out portion is provided in a rear bottom portion of the rear case, and wherein the bracket comprises a portion for pushing the apparatus and a portion for securing the apparatus at a lower surface thereof, and wherein the apparatus comprises an upper plate and a lower plate vertically disposed relative to the upper plate, said lower plate having a resilient protrusion secured to the portion for securing the apparatus, and said lower plate sliding beneath the bracket.

22. The monitor of claim 19, wherein the apparatus comprises a resilient protrusion, and the resilient protrusion is inserted into a hole formed at a rear wall of the bracket.

23. An apparatus for securing a cable to an electric device having an outer case, said apparatus comprising a body engaging the outer case and forming a part of the outer case when engaging the outer case, said body separating the cable from the electric device without interference with the outer case when detached from the electric devices;

wherein the body comprises a lower plate and an upper plate, and wherein the upper plate and the lower plate are interconnected with a bending line therebetween, and said upper plate fits into a groove provided in a metal bracket within the electric device, and wherein said lower plate has a resilient protrusion formed therein to snap fit the body to the electric device.

24. The apparatus of claim 23, wherein the upper plate has a hole formed therein for receiving and fixing the cable therein.

25. The apparatus of claim 23, wherein said lower plate has a resilient protrusion formed therein to snap fit the body to the electric device.

26. The apparatus of claim 23, further comprising a resilient protrusion protruding from the apparatus.

27. An apparatus for securing a cable to an electric device having an outer case, said apparatus comprising a body engaging the outer case and forming a part of the outer case when engaging the outer case, said body separating the cable from the electric device without interference with the outer case when detached from the electric device;

said apparatus further comprising a resilient protrusion protruding from the apparatus, and wherein the resilient protrusion is inserted and fixed into a hole provided in the electric device, and wherein the body engages a groove provided in the outer case of the electric device, and wherein protruding walls are provided on both sides of the groove, thereby limiting movement of the apparatus.

28. The device of claim 27, wherein the apparatus comprises an upper plate and a lower plate fixed vertically to the upper plate, and wherein the resilient protrusion is provided in the lower plate.

29. The device of claim 27, further comprising pushing means for pushing the apparatus toward the groove when assembling, and for preventing the cable from moving toward the inside of the electric device.

30. The apparatus of claim 29, wherein the pushing means comprises a metal bracket for receiving a circuit board.

31. The apparatus of claim 23, further comprising pushing means for pushing the apparatus toward the groove when assembling, and for preventing the cable from moving toward the inside of the electric device, said pushing means being provided at a bottom portion of the metal bracket.

32. The apparatus of claim 23, wherein the apparatus closes a portion of the outer case of the electric device when the apparatus engages the outer case after assembly.

* * * * *